United States Patent [19]

Boyd

[11] Patent Number: 4,592,390

[45] Date of Patent: Jun. 3, 1986

[54] FLOW WASHER

[75] Inventor: Richard M. Boyd, St. Louis Park, Minn.

[73] Assignee: Minnesota Rubber Company, Minneapolis, Minn.

[21] Appl. No.: 602,934

[22] Filed: Apr. 23, 1984

[51] Int. Cl.⁴ .............................................. F16L 55/04
[52] U.S. Cl. ......................................... 138/45; 138/44
[58] Field of Search ............................. 138/40, 44, 45; 239/533.13, 533.14; 137/517

[56] References Cited

U.S. PATENT DOCUMENTS

| | | |
|---|---|---|
| 1,754,466 | 4/1930 | Hosking . |
| 2,593,315 | 4/1952 | Kraft . |
| 2,775,984 | 1/1957 | Dahl ...................................... 138/45 |
| 2,891,578 | 6/1959 | Dahl et al. ............................. 138/45 |
| 3,566,902 | 3/1971 | Muller ................................ 138/45 X |
| 3,750,710 | 8/1973 | Hayner . |
| 3,799,132 | 3/1974 | MacGuire . |
| 3,837,363 | 9/1984 | Meronek . |
| 4,105,050 | 8/1978 | Hendrickson et al. ............... 138/45 |
| 4,190,910 | 3/1980 | Teglund et al. . |
| 4,457,343 | 7/1984 | Zubausky ............................. 138/45 |
| 4,492,339 | 1/1985 | Kreitzberg ........................ 138/45 X |

Primary Examiner—James E. Bryant III
Attorney, Agent, or Firm—Schroeder & Siegfried

[57] ABSTRACT

A flow washer in the form of a disc constructed of flowable-under-pressure, flexible, resilient material and having a plurality of closely spaced thin fins extending radially inwardly from an outer wall and terminating short of the disc's center to cooperatively define an axial orifice inwardly thereof. A method of making the flow washer is also disclosed.

15 Claims, 4 Drawing Figures

FLOW WASHER

BACKGROUND OF PRIOR ART

Flow washers are conventionally utilized in water discharging conduits in an effort to control the flow of water therethrough so as to make the flow volume more uniform under various or varying source pressure conditions. Such flow washers are frequently utilized under such varying conditions in combination with timers, in an effort to dispense a predetermined quantity of water where such is desired, as in washing machines. Since city water pressures vary between 15 p.s.i. and 120 p.s.i., the flow volume through a given valve will vary widely, absent such a flow washer.

Flow washers presently in common use are generally discs constructed of a flexible resilient material and having a central orifice extending therethrough, the washer distorting to different extents under different pressure conditions and thereby reducing the size of its orifice as the source pressure is elevated. As a consequence, some measure of control is accomplished at the higher pressures, but at the lower ranges of pressure, such flow washers are inadequate in that they do not readily provide for an adequate flow therethrough. Thus, for such flow washers, at lower source pressures ranges, the volume of flow is substantially less than that which will be permitted to pass at more elevated source pressures and therefor, it is impossible to properly time such a machine so as to insure that the desired amount of flow will result at both low and elevated source pressures. My invention is directed to solving this problem in a simple and relatively inexpensive manner.

BRIEF SUMMARY OF THE INVENTION

My invention provides an essentially uniform flow over a wider and important range of source pressures. As a consequence, my flow washer, when used in combination with a timer, will provide essentially a uniform volume of flow over the entire normal range of source pressures. I accomplish this by constructing the flow washer differently so as to inherently increase, as a result of its structure, the amount of water which is permitted to pass, therethrough throughout the lower ranges of source pressure. In other words, I have provided a flow washer with different structural characteristics which causes a greater flow to pass therethrough at lower pressures.

I do this by defining the orifice of the flow washer with a plurality of closely adjacent but spaced radially and axially extending fins which are supported by an annular outer wall. At lower pressures, the water readily flows through the narrow slots which separate the fins, as well as through the central orifice. At higher pressures, however, the thin fins deform and gradually close off the slots therebetween, through which water will flow at the lower pressures. As a consequence, I am able to substantially increase the flow at such lower pressures by, in effect, increasing the effective size of the orifice, in that the liquid is permitted to flow through the slots as well as through the orifice thereby raising the flow volume to the same level as that reached at higher source pressures. At higher pressures, the fins deform and close off the slots and the disc in general is compressed so that the main orifice is diminished, thereby reducing the size of the path through which the liquid may flow and controlling that flow at a uniform volume.

Thus, it is an object of my invention to provide a flow washer which will permit essentially equally high volumes of flow therethrough at low source pressures as at high source pressures.

DETAILED DESCRIPTION OF INVENTION

Figure 1:
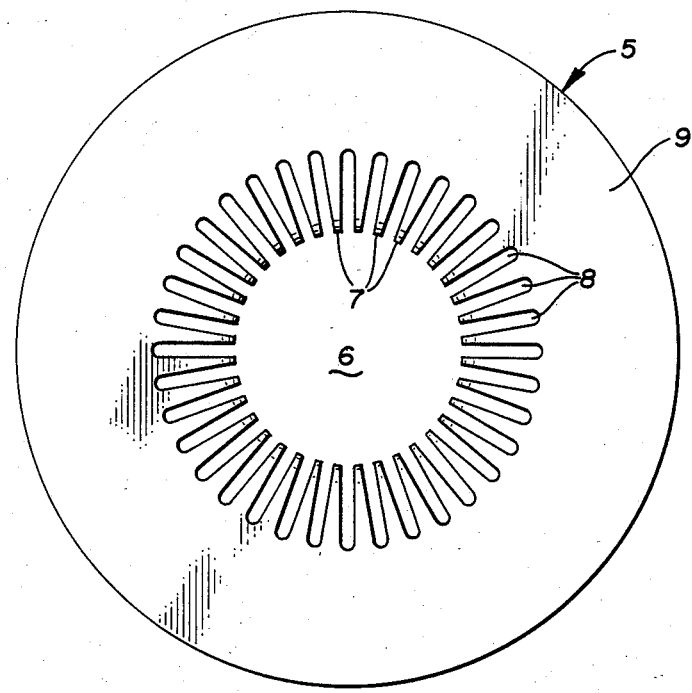
FIG. 1 is a plan view of my novel flow washer as viewed from the outlet side.
Figure 2:
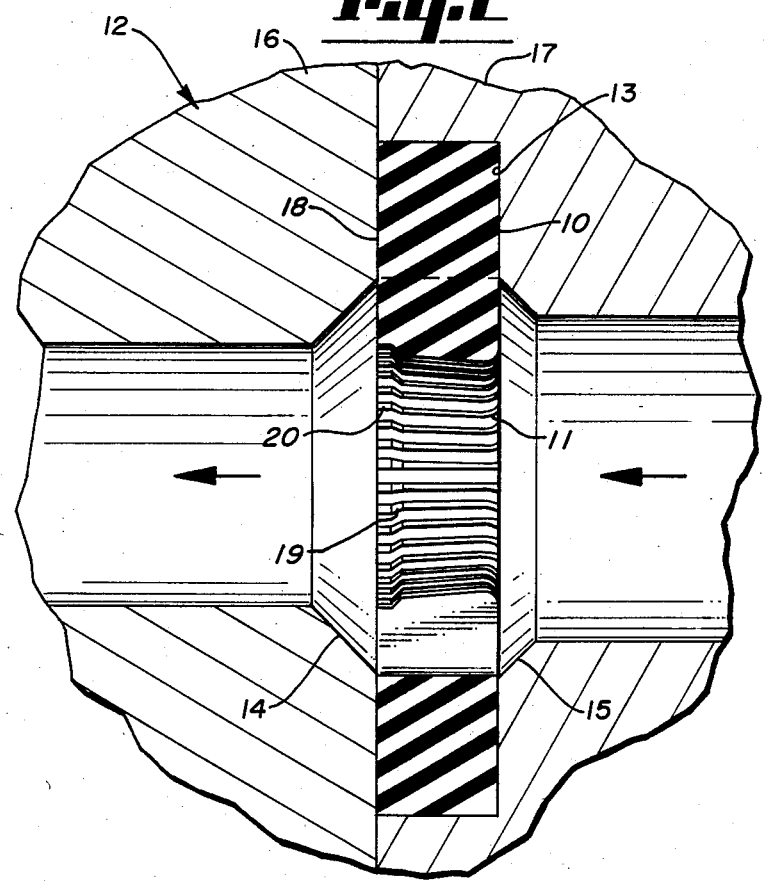
FIG. 2 is a vertical sectional view taken through one of my flow washers mounted in functioning position within a conduit, to effectively regulate the flow volume therethrough.

The preferred embodiment of my invention is shown in FIGS. 1-2, herein. As shown, it is comprised of a flow-control member in the form of a disc 5 having an axially extending orifice 6 which is defined by a plurality of radially extending fins 7. These fins 7 are separated by slots 8 which are preferably of uniform width. As shown, the fins 7 are carried by an outer annular supporting wall 9 which has radial dimensions approximating those of the fins 7, and which supports the fins 7 at its inner diametrical surface. The free inner end portions of the fins 7 are radiused slightly adjacent the inlet side 10 of the disc as at 11 to produce a more uniform flow.

FIG. 2 shows a conduit 12 having a groove or flow washer seat 13 formed therein to receive and hold such a flow control member, the arrows showing the direction of flow therethrough. As shown, the conduit is beveled at 45° as at 14, 15 at opposite sides of the disc and is comprised of sections 16, 17 which are secured together in any simple conventional manner (not shown). Such connections are conventionally utilized on conduits where there is need for such flow control as in wash machines, shower heads, etc.

Also, as shown in FIG. 2, the orifice defining portions of the disc 5 adjacent its outlet side 18 increase slightly in radius at a 45° angle as at 19 and then extend parallel to the axis of the orifice again as at 20. This increase in radius is provided to insure that any material left at the parting line will be located outside the flow of liquid therethrough and thus will not disrupt the flow stream.

The disc 5 is preferably made of a flowable-under-pressure, flexible, resilient elastomeric or plastic material. Among such materials are an ethylene propylene diene monomer, a silicone, or a nitrile. The material should have a hardness range of 30–95 durometer Shore A, preferably 50–70 durometer Shore A. The material is highly resistant to deterioration which otherwise may result from prolonged periods of time within water.

The market demand is principally for flow washers having an outer diameter of 0.680 inches, which is standard in that 85–90% of the flow washers currently sold are of this dimension.

There is a limited demand for flow washers having O'D's as low as 0.300 inches and some may go as low as 0.200 inches. The bulk, however, have O'D's approximating 0.680 inches which is the dimension of the disc 5 shown herein. The axial dimensions of the disc 5 are preferably within a range of 0.095–0.150 inches.

The radius of the orifice 6 may and does necessarily vary, depending upon the flow volume desired. I prefer, however, to maintain the length of the fins 7 at or about 0.100 inch and the radial dimensions of their supporting annular wall 9 at the same dimension. Thus, a disc having a 0.100 radius orifice will have a 0.300 overall radius, a disc having a 0.150 inch orifice radius will have a 0.350 inch overall radius, and a disc having an orifice with a 0.200 inch radius will have an overall radius of 0.400 inches.

As shown, the slots 8 which are cut in the disc 5 are 0.012 inches in width. They are preferably uniform in width within a range of 0.010–0.020 inches, and extend radially as shown. The preferred width range is 0.0125 to 0.0165 inches. The slots define the fins 7 therebetween, the latter having dimensions of 0.002–0.007 at their inner free end tips and substantially wider dimensions at their base, as shown.

It will be noted that the radial length of the fins 7 approximates the radial dimensions of outer wall 9 as well as the radius of the orifice 6. The supporting wall 9 may be thicker but should not be lesser in radial dimensions than those of the fins. The lengths of the fins 7 are preferably within a range of 0.070–0.130 inches.

The slots 8 can be cut through a molded preform disc 5, made of one of the materials hereinbefore defined. The fins 7 and the slot 8 must be narrow as defined, in order to function properly. It is impossible however, to cut such slots by mechanical means because the radially deformable material from which the disc is made will flow. I have found, however, that through the use of a Laser beam, I can cut such narrow slots and define such narrow fins. It is impossible to mold such fins because the portions of the mold which would define the same will collapse at standard molding pressures.

Figure 3:
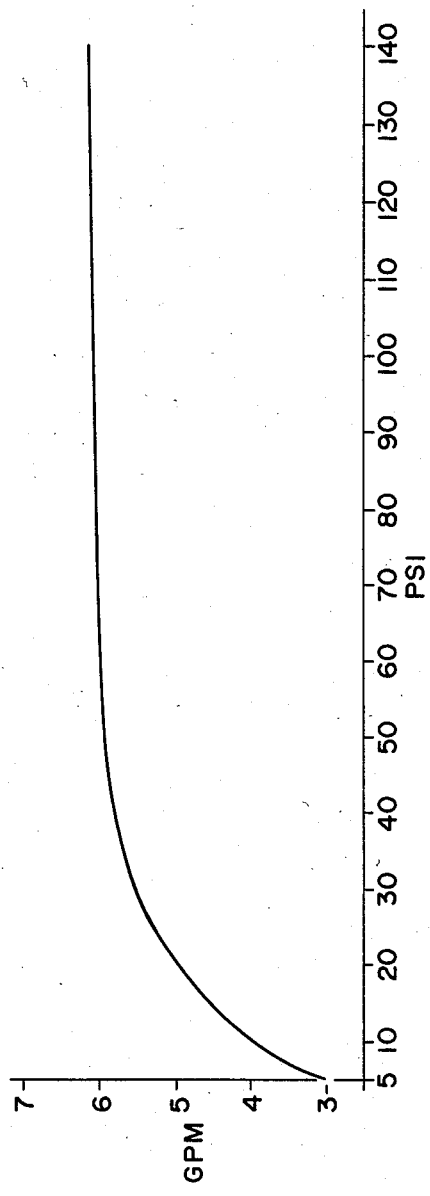
FIG. 3 is a chart diagram illustrating the flow volumes at varying source pressures through flow washers as heretofore known.
Figure 4:
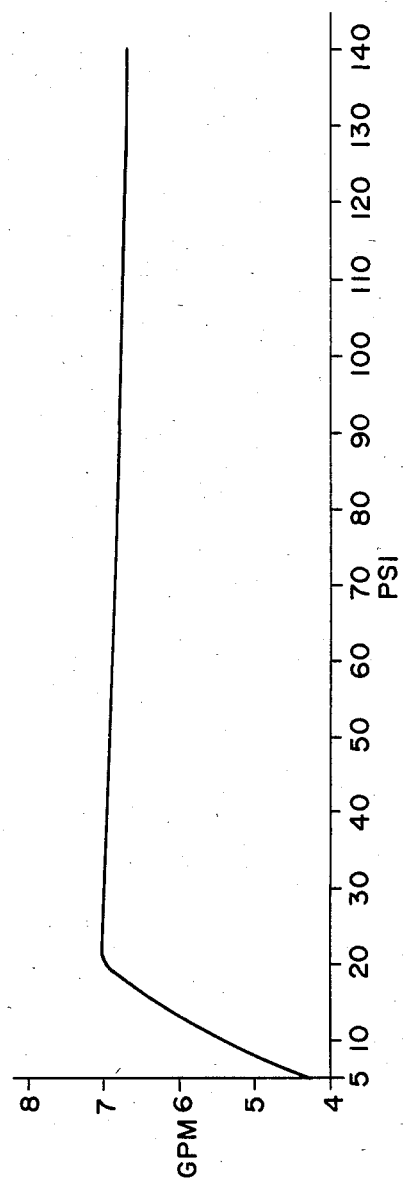
FIG. 4 is a chart diagram illustrating the flow volumes at varying source pressures through my new flow washer.

It will be readily seen that at low pressures, the slots 8 remain defined, with the result that a greater volume of liquid may pass through the orifice 6 and slots 8 of the disc then could otherwise flow through only its orifice. As the pressures raise, however, the fins 7 deform and close off the slots 8 so that all of the liquid must pass through the disc orifice. As the pressure mounts, the disc deforms further to restrict the orifice itself, in the same manner as heretofore occasioned in the use of conventional flow washers. As a result of the above action, such a flow-washer produces a uniform flow volume over a wider range of pressures, as shown by the charts of FIGS. 3 and 4. This is particularly evident in the lower pressure ranges where there presently is the greatest need for improved performance.

Reference to FIG. 3 shows the flow volume in gallons per minute when using a flow washer commonly in use today and prior to my invention. It will be seen that at pressures of 45 p.s.i., and greater, the flow is fairly uniform at 6 gallons per minute. Below 45 p.s.i., however, the flow volume drops off markedly so that at 20 p.s.i. it permits only 5 gallons per minute and at 15 p.s.i. it permits only 4.5 gallons per minute.

Reference to FIG. 4 shows the flow volume of my new flow washer at such low pressures at substantially higher levels. Thus, at 20 p.s.i., there is a flow of 7 gallons per minute and at 15 p.s.i. there is a flow of 6.7 gallons per minute. At 20 p.s.i., and for all pressures thereabove, there is a uniform flow of approximately 7 gallons per minute.

From the above, it can be seen that I have provided a flow washer of new design and material which markedly increases the flow of liquid permitted therethrough at the lower end of the pressure level range of conventional city water sources. This is particularly important for use wherein valves are coordinated with timers to control the length of time a valve is opened, such as in washing machines, where a predetermined volume of water needed. This is also of particular value in irrigation, wherein currently efforts are being made to greatly reduce the pressures needed, to 30 p.s.i. in order to conserve energy.

In considering the invention, it should be remembered that the present disclosure is illustrative only and the scope of the invention should be determined by the appended claims.

I claim:

1. A flow washer comprising:
   (a) a flow control member constructed and arranged to be disposed within a flow washer seat of a water conduit to control the flow of water therethrough at a substantially constant volume throughout the pressure range of a conventional water supply connected to the conduit;
   (b) said flow control member being constructed throughout of a flowable flexible resilient material resistant to prolonged periods of time within water and being of substantially uniform axial dimensions throughout, said flow-control member having an orifice extending axially and centrally therethrough;
   (c) said flow-control member being comprised of an annular outer wall;
   (d) a plurality of spaced but closely adjacent thin fins extending radially inwardly from said wall, said fins having free end portions defining said orifice therebetween and extending entirely within the general plane of said wall; and
   (e) said fins being spaced from each other by slots having widths within a range of 0.0125 inches to 0.0165 inches and having widths within the range of 0.002 to 0.007 inches at their free end portions.

2. The structure defined in claim 1 wherein said flow control member has an inlet side and an outlet side and said fins have terminal portions which are slightly radiused adjacent said inlet side.

3. The structure defined in claim 1 wherein said fins are spaced from each other by slots which are substantially uniform in width throughout their individual lengths.

4. The structure defined in claim 1 wherein the axial dimensions of said flow control member are within the range of 0.095–0.150 inches.

5. The structure defined in claim 1 wherein said fins approximate 0.100 inches in radial dimensions.

6. The structure defined in claim 1 wherein said fins each approximate 0.100 inches in radial dimensions and said wall has radial dimensions no less than 0.100 inches.

7. The structure defined in claim 1 wherein said fins approximate 0.100 inches in radial dimensions and are spaced from each other by slots having widths within a range of 0.0125 inches to 0.165 inches.

8. A flow washer for mounting within a flow washer seat of a water conduit to control the flow of water there through at a substantially constant volume throughout the pressure range of a conventional water supply connected to the conduit comprising:

(a) a disc made of a flowable flexible resilient material resistant to prolonged periods within water and having a central orifice extending axially therethrough and an outer annular wall extending around said orifice;
(b) said disc having a plurality of adjacent pairs of narrow elongated closely adjacent slots extending radially inwardly from said wall and axially through said disc and communicating with said orifice;
(c) said slots defining between adjacent pairs thereof a plurality of closely adjacent but spaced thin fins extending radially inwardly from said wall to said orifice and entirely within the general plane of said disc;
(d) each of said slots having a width within a range of 0.010–0.020 inches; and
(e) each of said fins having free ends with widths approximately 0.002 to 0.007 inches.

9. A flow washer for mounting within a flow washer seat of a water conduit to control the flow of water there through at a substantially constant volume throughout the pressure range of a conventional water supply connected to the conduit comprising:
(a) a disc made of a flowable flexible resilient material resistant to prolonged periods within water and having a central orifice extending axially therethrough and an outer annular wall having an inner diametrical surface extending around said orifice;
(b) a plurality of thin elongated closely adjacent but spaced fins carried by said annular wall and extending radially inwardly from separte but closely adjacent points located along the entire inner diametrical surface of said wall, said fins extending entirely within the general plane of said disc;
(c) said fins being circumferentially spaced from each other a distance within a range of 0.010–0.020 inches and extending axially of said disc and having inner end portions terminating in spaced relation to each other to cooperatively define said orifice; and
(d) said free end portions having a width approximating 0.002 to 0.007 inches.

10. The structure defined in claim 9 wherein said disc has an inlet side and an outlet side and said inner end portions of said fins are radiused slightly adjacent said inlet side.

11. The structure defined in claim 9 wherein said fins are spaced from each other by slots having a width ranging between 0.0125–0.0165 inches.

12. The structure defined in claim 9 wherein said fins are spaced from each other by slots which are substantially uniform in width throughout their individual lengths.

13. The structure defined in claim 9 wherein the axial dimensions of said disc are within the range of 0.095–0.150 inches.

14. The structure defined in claim 9 wherein said fins have radial dimensions approximating 0.070–0.130 inches.

15. The structure defined in claim 9 wherein said wall and said fins each have radial dimensions approximating 0.070–0.130 inches.

* * * * *